United States Patent [19]

Müller

[11] 4,398,134
[45] Aug. 9, 1983

[54] TWO-PULSE PERMANENT MAGNET BRUSHLESS D-C MOTOR

[75] Inventor: Rolf Müller, St. Georgen, Fed. Rep. of Germany

[73] Assignee: Papst-Motoren KG, St. Georgen, Fed. Rep. of Germany

[21] Appl. No.: 147,144

[22] Filed: May 6, 1980

[30] Foreign Application Priority Data

May 15, 1979 [DE] Fed. Rep. of Germany ....... 2919581

[51] Int. Cl.³ .......................................... H02K 29/02
[52] U.S. Cl. ................................... 318/254; 518/138
[58] Field of Search ................... 318/254, 254 A, 138, 318/439

[56] References Cited

U.S. PATENT DOCUMENTS

| | | | |
|---|---|---|---|
| 3,873,897 | 3/1975 | Müller | 318/138 |
| 3,891,905 | 6/1975 | Müller | 318/254 |
| 4,011,475 | 3/1977 | Schmider | 310/68 R |

Primary Examiner—J. V. Truhe
Assistant Examiner—Saul M. Bergmann
Attorney, Agent, or Firm—Frishauf, Holtz, Goodman & Woodward

[57] ABSTRACT

To reduce even instantaneous torque variations when pole gaps of a rotor pass stator pole gaps, the stator pole shoes, adjacent the tip, are shaped to provide an air gap (19) which, behind a projecting tip (FIG. 4: 61) first increases to an intermediate value (53) and then decreases to a minimum (50, 50B) over a zone (54) adjacent the pole gap (44A, 44B) which extends, preferably, over about 7° to 20°-el. Preferably, the opposite pole tip (51A) likewise has a projecting end (61A) with an air gap increasing to a maximum (52) and then decreasing essentially monotonically over the major portion of the pole shoe (41) to the minimum (50) close to the other pole tip (51), the maximum air gap (52) being offset about 10°-20°-el from the actual end of the pole tip (51A). Preferably, the pole gaps (17) on the permanent magnet rotor are narrow and skewed over an extent at least as wide as the stator pole gaps (44), for example between 20° to 45°.

24 Claims, 5 Drawing Figures

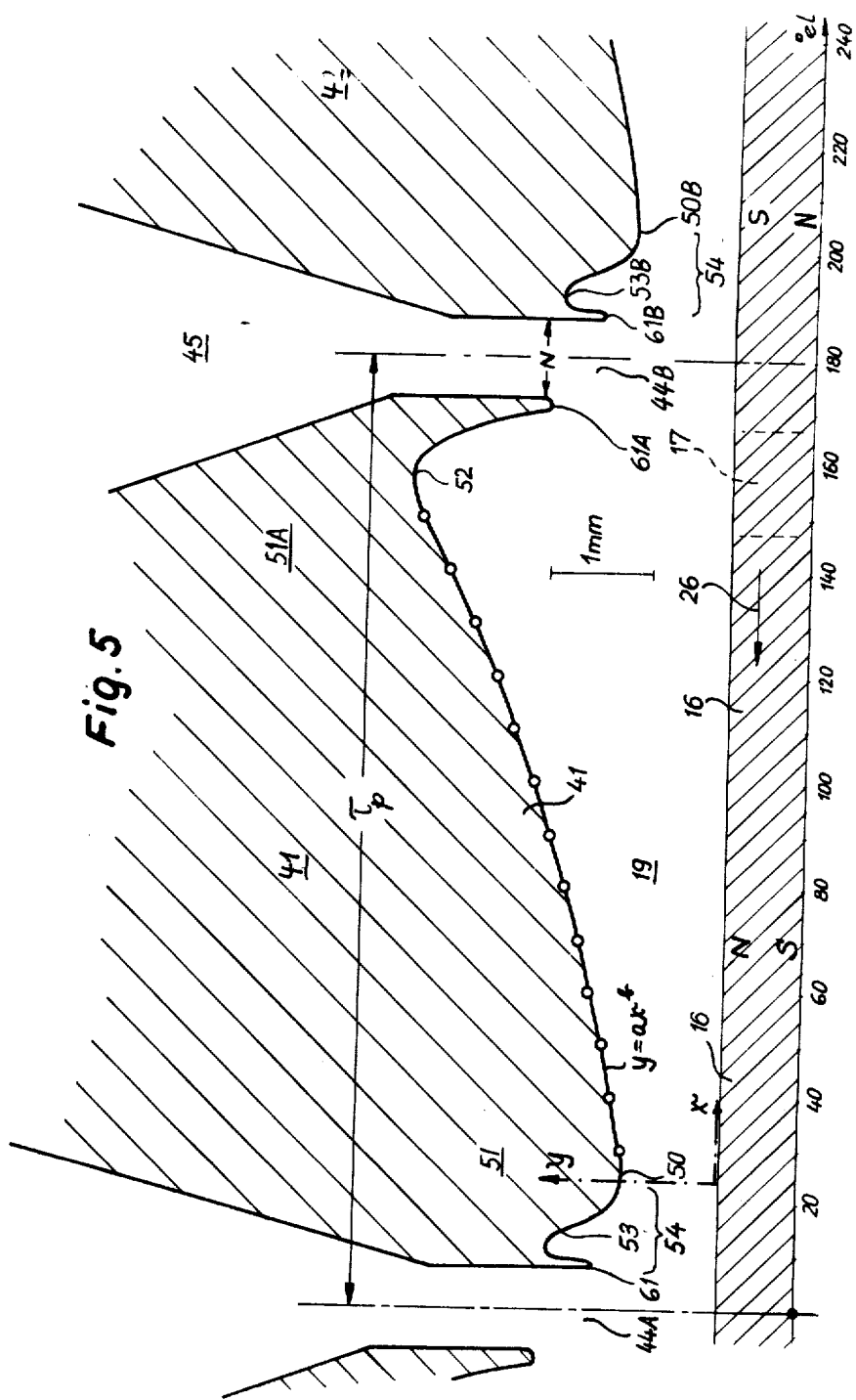

TWO-PULSE PERMANENT MAGNET BRUSHLESS D-C MOTOR

The present invention relates to a brushless permanent magnet d-c motor, and more particularly to such a motor having a cylindrical air gap in which the stator structure includes armature pole shoes which have a non-cylindrical circumference so that the air gap is non-uniform.

BACKGROUND AND PRIOR ART

A motor with a non-uniform air gap is described in the referenced and incorporated application Ser. No. 060,879 of July 26, 1979, refiled as a continuation-in-part under Ser. No. 220,181, filed Dec. 23, 1980, by the inventor hereof. Motors with non-uniform air gaps and which are pulse-energized are now known in the Art and have been described in both patent as well as technical literature, see, for example, German Pat. No. 23 46 380, assigned to the assignee of this application; and an article by the inventor hereof entitled "Two-Pulse Brushless d-c Motors - Construction and Operation", published in "asr-digest für angewandte Antriebstechnik," issue 1-2/1977 (asr-digest for applied motive power technology), pages 27–31.

Two-pulse brushless d-c motors may be defined as motors which have a stator winding which receives two current pulses for each rotation of the permanent magnet rotor over 360 electrical degrees (°-el). Typically, the pulses do not last for 180°-el but are shorter. Current flow through the windings or coils of the stator, typically, is controlled by solid-state switching elements, such as transistors, which are controlled to conduction or cut-off, respectively, by a galvano magnetic sensor, for example a Hall generator.

Motors, for example as described in the aforementioned German Pat. No. 23 46 380, are suitable for many applications. Some applications require an extreme of uniformity of torque throughout the entire range of rotation of the rotor. The stator structure, using salient poles, will have gaps between the poles. These gaps are needed in order to permit winding of the armature windings on the stator poles. The presence of these stator pole gaps can become troublesome in selected applications where an extreme of uniformity of torque is required. If the motor or its connected elements have sufficient inertia, then the torque variations due to the stator pole gaps may not be material. The momentary or instantaneous variations in speed as the torque changes when a magnetically active portion of the permanent magnet rotor passes over the pole gaps are difficult to measure with the type of measuring equipment usually used to test motors. In applications in which the resolution of instantaneous speed is critical, however, for example in video recording equipment, momentary variations in operating speed may produce distortions in the resulting picture. These distortions, apparently, are caused by the rotor pole gaps passing over the stator pole gaps and receiving, first, a driving reluctance torque—due to the increase in air gap, and then a braking or retarding reluctance torque, due to the decrease in effective magnetic air gap.

THE INVENTION

It is an object to provide a permanent magnet (PM) brushless d-c motor which has a torque-revolution characteristic representing an extreme of uniformity, while still permitting a stator pole gap which is comparatively wide with respect to the arc covered by the stator pole shoe.

Briefly, the stator pole shoe is so constructed that, starting from a first pole tip adjacent a pole gap, and with respect to the angular circumference of the pole shoe, the air gap first increases to a maximum which is positioned inwardly of and close to the first pole tip. The air gap then decreases over the major portion of the pole shoe to a minimum which is positioned inwardly of and close to the other pole tip, to then increase to an intermediate value leading towards the other pole tip of the respective pole shoe. In essence, the shape of the air gap in the region of the pole gap, with respect to an outer cylindrical theoretical envelope, has approximately the cross-section of a biconvex lens. The lensatic cross section extends, for example, for a distance of about 7° to 20°-el.

The particular structural shape of the pole shoes thus provides a reluctance torque which increases already before the stator pole gap is reached by any particular element of the rotor, for example a pole gap thereof during rotation of the rotor. Variations in torque, as the rotor rotates, thus are effectively avoided.

In accordance with a preferred feature of the invention, the region of the stator pole tip which has the maximum air gap is offset approximately 10° to 20°-el away from the pole tip itself. The maximum extent of this air gap is greater than the value of the air gap at the other pole tip. The pole tips, preferably, are shaped to form a depression inwardly from the tip ends themselves, so that the air gap, starting from the pole gap towards the center of the pole in either direction first increases somewhat and then again decreases, as aforesaid.

In the preferred form, in which the maximum air gap is offset about 10° to 20°-el from the pole tip, a preferred starting position for the rotor will be defined since, then, a rotor pole gap will be approximately opposite the region of maximum air gap. This defined stopping position of the rotor, upon de-energization of the windings, defines a predetermined stop position which, upon re-energization, insures starting under optimum electrical conditions and in one direction only.

Preferably, the rotor pole gaps are skewed, that is, inclined with respect to the axis of rotation—in the cylindrical air gap motor—and, desirably, include an acute angle with respect to stator pole gaps. Of course, the relationship can be reversed, that is, the stator pole gaps can be skewed with respect to the axis of rotation; for ease of winding, however, skewing the rotor pole gaps is preferred. The extent of inclination or skew should be such that the rotor pole gap extends from one pole tip of the stator to the other. In some motors, this may result in a skew angle of, for example, 45°.

DRAWINGS

FIG. 5 is an enlarged developed view of the air gap of the motor of FIGS. 1 to 4 over a portion of the circumference thereof, and is the mirror image of the presentation of FIG. 4.

Figure 1:
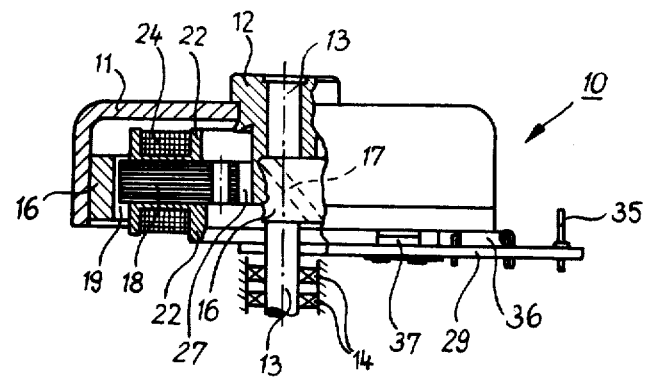
FIG. 1 is a highly schematic view, partly in section, of a motor incorporating the invention and illustrated as an external rotor motor, the section being taken along line I—I of FIG. 2.

FIG. 1 illustrates an external rotor motor 10 drawn, for one model, approximately to a scale of 1:1. It has a rotor bell 11 made of deep-drawn steel, and having a center bushing 12 fitted thereon, coupled to a shaft 13. Shaft 13 is journaled in suitable bearings 14 externally of the motor, and secured in a suitable frame or support, not shown. A magnetic ring 16 is adhesively secured to the inside 15 of the rotor bell 11. Typically, ring 16 is a rubber magnet, that is, a mixture of hard ferrite material and elastomeric material. The ring 16 is radially magnetized and has four poles, see FIG. 5, in which two poles are shown. The pole gaps 17 of the rotor 16 are highly skewed or inclined and, in a four-pole motor as shown, are inclined approximately by 45° (FIG. 1). The inclination or skew is so selected that uniform torque or uniformity of running and speed throughout the entire rotation is obtained; in other words, the torque output per incremental angular rotation is uniform. The extent of inclination or skew of course depends on the height or thickness of the stator laminar stack 18 and of the width N (FIG. 5) of the stator pole gaps 44. The stator stack 18 is coated with a plastic—except at the air gap 19—which simultaneously is shaped to provide coil forms 22 (FIG. 1). Four stator windings or coils are wound on form 22; only windings 23, 24, 25 are visible in FIGS. 1 and 2. The windings can be arranged in various ways. A motor with extremely uniform torque and two-pulse operation is described in the literature, and specifically in German Pat. No. 23 46 380, FIG. 1, or in connection with FIGS. 2 and 3 of the aforementioned literature reference "Two-Pulse Brushless d-c Motors" by the inventor hereof. Two current pulses are supplied to the winding for each rotor rotation of 300°-el. Typically, the duration of a pulse is less than 180°-el so that gaps in the electromagnetic drive torque will result. These gaps in torque are supplemented by a reluctance torque—see, for example, the referenced U.S. application Ser. No. 60,879, July 26, 1979, by the inventor hereof (and see also FIG. 5 of the aforementioned German Pat. No. 23 46 380, and FIG. 9 of the referenced literature). Since the basic structure, as well as the operation and the operating theory, is known and described in the literature, and thus forms part of the state of the Art, a further detailed explanation is not necessary. A brief review will be given below where the difference between the present invention and prior art structures is explained.

Figure 2:
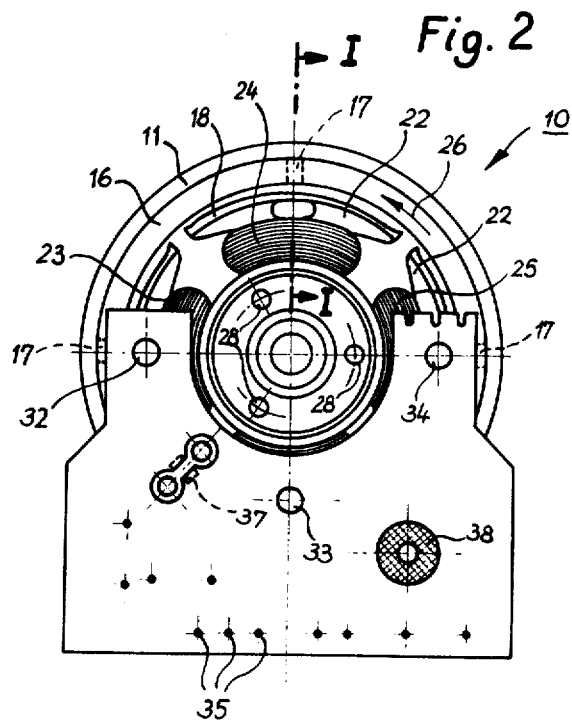
FIG. 2 is a top view of the motor of FIG. 1.
Figure 4:
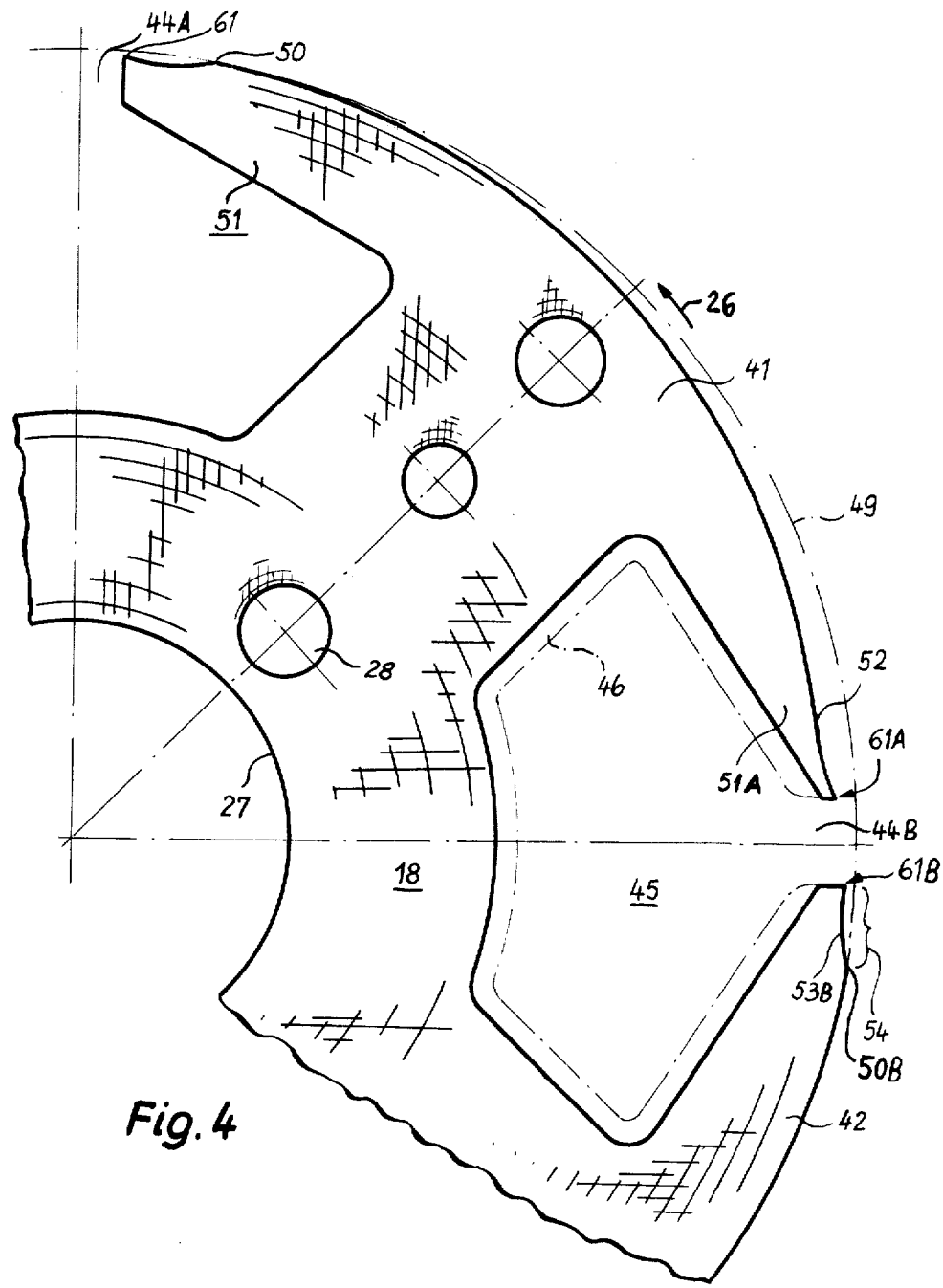
FIG. 4 is a fragmentary view of the stator lamina of FIG. 3, to a scale of about 5:1 with respect to FIG. 3.

The direction of rotation of the motor is indicated in FIGS. 2, 4 and 5 by arrow 26.

The stator package or stack 18 is formed with a central opening 27 through which the bushing 12 extends; further, three attachment holes 28 (FIG. 2) are provided in order to attach the motor to the support structure, which also, can retain the bearing. The external rotor 11 can be used to directly drive a utilization element.

A printed circuit (PC) board 29 is secured to the lower side of the motor 10 (FIG. 1), attached to the stator winding form 22 at three attachment points 32, 33, 34. Connecting pins 35 and electrical and electronic elements 36 are retained on the PC board. The PC board further carries a Hall generator 37 which, as shown, is positioned approximately over the pole gap between a pair of stator poles—compare also the referenced application by the inventor hereof. Hall generator 37 is offset slightly in the direction of rotation of the rotor—for example by about 1 mm—in order to obtain magnetic feedback with respect thereto, as described and claimed in U.S. Pat. No. 4,099,104.

Hall generator 37 is used to control flow of current through the motor windings. It is controlled by the magnetic field from the rotor magnet 16. A rubber bushing 38 is secured to the PC board 29 to attach a connecting cable thereto. The respective terminals of the windings 23, 24, 25 are soldered to suitable connecting pins or eyes of the PC board 29.

The stator stack 18 has four salient poles 40, 41, 42, 43. The poles are identical and separated from each other by pole gaps 44 which lead inwardly to grooves or slots 45 in which—as best seen in FIGS. 1 and 2—the windings 23,—are placed. The winding slots 45 are covered with insulating material 46 which, as described, extends to form the winding forms 22. The extent of the insulating material 46 is shown in chain-dotted lines in FIG. 4, and forms an integral part of the winding forms.

In accordance with the present invention, the shape of air gap—especially in combination with the magnetization of the rotor magnet—is of critical importance in order to obtain the desired course of the reluctance torque. In theory, it would be desirable to obtain a completely monotonic air gap, that is, an air gap free of any magnetic discontinuities. In actual practice, however, this cannot be achieved since the pole gaps 44 are required in order to permit introduction of the wire for the windings into the grooves 45. Thus, the gaps 44 must have a certain minimum width. In the motor illustrated, the stator stack 18 has a diameter of 56 mm; the pole gaps have a width N of 3 mm. This is about the minimum which permits introduction of a wire for winding under commercially reasonable conditions. The pole gaps 44 introduce momentary or instantaneous variations in torque. In most all applications, these minute variations in torque can be neglected. In some extremely sensitive applications, however, for example in video recording equipment, these minute instantaneous variations may cause disturbances. The present invention is directed to reducing these instantaneous variations in drive torque and is particularly applicable for small motors in which the width of the pole gaps is relatively great with respect to the overall length of the pole shoe.

For a motor of 56 mm diameter, corresponding to a pole pitch of about 44 mm in a four-pole motor, the relationship of pole gap to pole pitch is about 7%; this percentage of course decreases with increasing motor diameter and then has decreasing influence on the course of the instantaneous torque-rotation relationship.

FIG. 5 illustrates—in developed, mirror image form—the air gap extending over 180°-el, that is, over one pole width. The air gap is the same for all four stator poles, and thus is shown in detail only with respect to pole 41.

Figure 3:
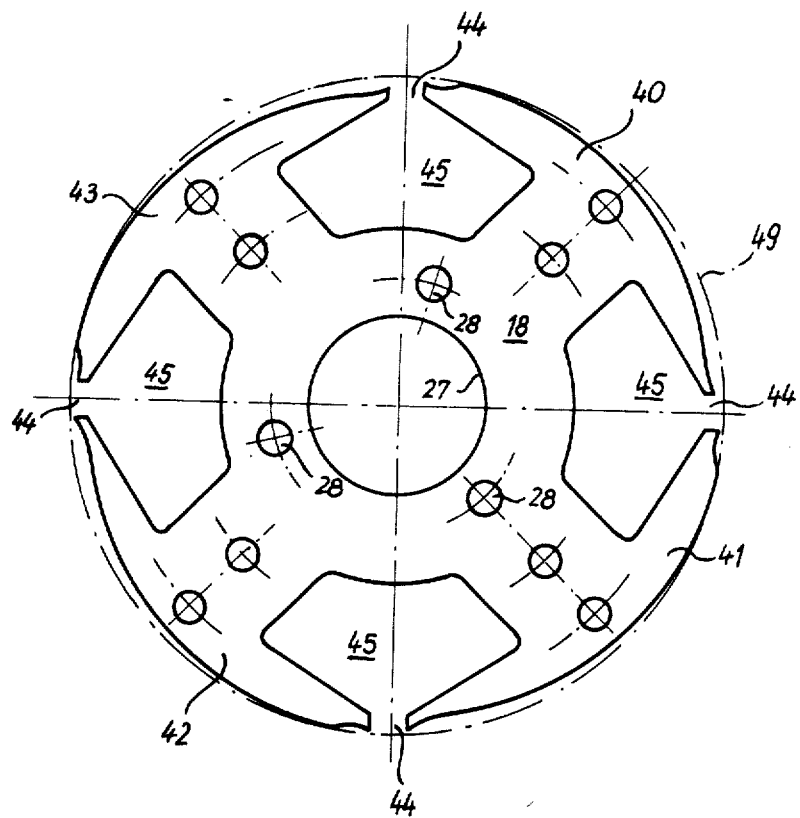
FIG. 3 is a top view of a stator lamina, used in the motor of FIGS. 1 and 2, and to an enlarged scale of about 2:1 with respect to FIGS. 1 or 2.

FIGS. 3 and 4 illustrate the circular cylindrical envelope 49 in chain-dotted outline of the stator stack 18. As best seen in FIG. 4, the point of minimum air gap 50 occurs at the upper pole tip 51, somewhat inwardly of the actual tip end 61. The point of maximum air gap 52 occurs at the lower pole tip 51A, also somewhat inwardly of the tip end 61A itself. The rotor magnet 16 is magnetized in trapezoidal magnetic shape (see the referenced application by the inventor hereof) and has narrow magnetic pole gaps 17, extending approximately from 10° to 20°-el between the poles. As described in connection with FIG. 1, the gaps 17 are skewed. In quiescent state, that is, when the motor 10 is deenergized, the rotor pole gaps 17 will position themselves opposite points 52, that is, at the widest position of the air gap 19. This position is indicated in FIG. 5. The reluctance torque, at that point, is zero. The air gap 19 decreases monotonically between the maximum point 52 and the minimum point 50, approximately according to the function of the formula $y = a \cdot x^b$, wherein y represents the width of the air gap, x the angle of rotation, and the abscissa can be taken approximately at the level of the point 50, that is, at the minimum air gap. Starting at the point of maximum air gap 52, and going upwardly in FIG. 4, which corresponds to going to the left in FIG. 5—see arrow 26—and extending towards the next adjacent pole gap shown in FIGS. 4 and 5 at 44A, the air gap decreases rapidly and to the minimum value corresponding to the minimum at point 50. In the example selected, the air gap at minimum point 50—about 25°-el from the center of the pole gap 44A (see FIG. 5) is approximately 1 mm—see the scale representation in FIG. 5. The maximum is about 3 mm at maximum point 52, that is, at about 160°-el. Adjacent the air gap 44B and at tip 61A, that is, at about 172°-el, the air gap is about 1.75 mm. These measurements are represented, to scale, in FIG. 5. At the other side of the pole gap 44B, that is, at the tip end 61B of pole 42 at about 188°-el, the air gap will be approximately 1.25 mm, increasing rapidly to about 1.6 mm at about 192°-el, to form an intermediate maximum 53B and then decrease to point 50B, corresponding to point 53 and 50 on the pole 41, that is, at about 205°-el, or 25°-el, respectively, to the minimum of about 1 mm.

In accordance with a feature of the invention, a zone 54 is provided between the minimum 50 (or 50B) and the tip ends 61B or 61 adjacent the pole gaps 44B or 44A, respectively, in which the air gap 19 passes through an intermediate height or level 53B, 53. This region 54 is relatively short, and in the example has a length of only about 15°-el. It has been found that this simple arrangement—see specifically the developed view of FIG. 5—effectively almost entirely eliminates variations in torque. This is so particularly when combined with the magnetization of the magnet 16, as specified, and the shape of the increasing air gap between the minimum at point 50 and the maximum at point 52. Otherwise, variations in torque may be caused by the relatively wide pole gaps 44, 44A, 44B in FIGS. 4 and 5. These torque variations thus can be effectively and almost entirely eliminated. Skewing the rotor pole gap 17 additionally effectively contributes to this result.

In the stator 18 for an external rotor motor, as shown at 10 in FIG. 1, the region or zone 54 together with the envelope 49 may have the shape of a biconvex lens—see FIG. 4. What is, however, important at all times is the course of the magnetically effective air gap 19. Various respectively different shapes of stator laminae can be used to obtain the particular air gap relationship—see, for example, U.S. Pat. No. 2,185,990, in which various shapes of laminae are described. The important feature is the generation of a driving reluctance torque. When the rotor pole gaps 17 pass over a stator pole gap 44, the rotor should not be excessively retarded or braked by the rapidly increasing air gap occurring at the edge of the stator pole gaps. The rotor has its quiescent or stop position at a predetermined position with respect to the stator and, specifically, at the point where the rotor pole gaps 17 will be opposite the position 52 defining the maximum air gap.

Looked at from another point of view, the invention can be considered as shifting the locus of generation of the rotary torque in the rotor pole gaps. When the rotor pole gaps pass over a region of increasing air gap, a driving torque is generated; when they pass over a region of decreasing air gap, a braking or retarding torque is generated. If one considers the rotor pole gaps 17 as optical elements which are extremely nearsighted, that is, if they are in the position of FIG. 5 opposite the additional iron tips 61, 61B at both sides of the stator pole gaps 44, then the rotor pole gaps 17 will "see" instead of the gap 44 an average volume of stator iron magnetic material which would correspond approximately to a uniform or monotonic air gap between the extreme values 50 and 52. It is important that these additional iron volume accretions 61, 61B at both sides of the gap opening 44 include a narrow angular range, that is, are concentrated within an angular range of only about 5° to 10°-el. Consequently, the characteristic tips 61, 61A will be formed at the ends of the pole tips 51, 51A extending in the direction towards the essentially cylindrical rotor, i.e. towards the air gap 19.

The developed view in accordance with FIG. 5 clearly shows these extending tips. The same principle, of course, can be applied to an internal rotor motor. For ease of visualization, one may consider FIG. 5 as being drawn on a stretchable support, for example a rubber band. For an external rotor motor, the drawing carrying FIG. 5 would have to be bent upwardly; for an internal rotor motor, the drawing carrying FIG. 5 would have to be bent downwardly.

In a preferred form, the rotor pole gaps 17 are skewed; the rotor pole gaps 17, of course, may also be made straight and, instead, the stator poles 40 to 43 can be skewed so that the stator pole gaps 44 will extend at an angle of about 20° to 45° with respect to the axis of rotation of the motor. Of course, it is also possible to skew both the rotor pole gaps and the stator pole gaps in opposite directions to obtain the relative skew angles. For ease of manufacture, skewing of the rotor pole gaps is preferred.

Various changes and modifications may be made within the scope of the inventive concept.

I claim:

1. Two-pulse brushless direct current (d-c) motor having
    an essentially cylindrical permanent magnet rotor element (11, 16) having approximately trapezoidal magnetization with narrow gaps (17) between the poles thereof;
    a stator element having a core (18), salient poles terminating in pole shoes (41-44) extending from the core, the tips of adjacent pole shoes being separated by pole gaps (44; 44A, 44B), and winding means (23, 25) on the poles positioned beneath the pole shoes;
    an essentially cylindrical air gap (19) separating said rotor element and said stator element;
    means (37) controlling current flow, in pulses, through respective winding means on the poles to produce, in operation, an alternating magnetic field to generate an electromagnetic driving torque in the rotor elements,
    said stator element pole shoes (41-44) being shaped, in the direction of rotation of the rotor element, to define magnetically effective air gap dimensions which increase and decrease over the angular range of the pole shoes and further to provide, in the region of the pole gaps (44), compensating means to compensate for torque variations due to the presence of the pole gaps, the pulsed current flow through said winding means being controlled by said current flow control means (37) to energize a winding means when a rotor pole gap passes through a zone of magnetically effective decreasing air gap, while a pulse gap is controlled to occur when the rotor pole gap passes through a zone of magnetically effective increasing air gap;

and wherein, in accordance with the invention, starting from a region (51A) just inwardly of a first pole tip (61A) adjacent a pole gap (44B)—with respect to the angular circumference of the pole shoe (41)—the air gap (19) is a maximum (52) and said air gap then decreases over a major portion of the pole shoe to a minimum (50) located inwardly of, and close to the other pole tip (61), and then increases again throughout a zone (54) towards said other pole tip (61) to an intermediate value (53).

2. Motor according to claim 1, wherein the course of the air gap (19) in said zone (54) leading towards said other pole tip—with respect to a cylindrical envelope (49)—has, in cross section, the approximate form of a biconvex lens.

3. Motor according to claim 2, wherein said zone (54) extends over a range of from between 7° to 20°-el from said other pole tip.

4. Motor according to claim 1, wherein the terminal ends (51, 51A) of the pole tips are formed with extensions (61, 61A) projecting towards the air gap.

5. Motor according to claim 1, wherein the air gap starting from said first pole tip (61A) first increases from an intermediate level to the position of maximum air gap (52), said position of maximum air gap being located inwardly of and close to said adjacent first pole tip (61A), said maximum air gap having a width which is greater than said intermediate value (53) of the air gap adjacent the other pole tip (61).

6. Motor according to claim 5, wherein the position of said maximum air gap (52) is approximately 10° to 20°-el away from the adjacent first pole tip (61A).

7. Motor according to claim 1, wherein the pole gaps (17) of the rotor element are inclined or skewed with respect to the pole gaps (44) of the stator element.

8. Motor according to claim 7, wherein said angle of inclination or skew is in the order of between 20° to 45°.

9. Motor according to claim 1, wherein the terminal ends (51, 51A) of the pole shoe tips have pointed projections (61, 61A) directed towards the rotor.

10. Motor according to claim 1, wherein the terminal zones (51, 51A) of the pole tips immediately adjacent the pole gaps (44) comprise zones of increased iron volume magnetically effective to decrease the magnetic effect of said pole gaps;

said zones of increased iron volume being concentrated within an angular range of between about 5° to 10°-el from the limit of the stator pole gap.

11. Motor according to claim 1, wherein the width (N) of the stator pole gaps is more than 5% of one pole pitch (180°-el).

12. Motor according to claim 11, wherein said motor is an external rotor motor.

13. Motor according to claim 6, wherein the pole gaps (17) of the rotor element are inclined or skewed with respect to the pole gaps (44) of the stator element.

14. Two-pulse brushless direct current (d-c) motor having an essentially cylindrical permanent magnet rotor element (11, 16) having approximately trapezoidal magnetization with narrow gaps (17) between the poles thereof;

a stator element having a core (18), salient poles terminating in pole shoes (41-44) extending from the core, the tips of adjacent pole shoes being separated by pole gaps (44; 44A, 44B), and winding means (23, 25) on the poles positioned beneath the pole shoes;

an essentially cylindrical air gap (19) separating said rotor element and said stator element;

means (37) controlling current flow, in pulses, through respective winding means on the poles to produce, in operation, an alternating magnetic field to generate an electromagnetic driving torque in the rotor elements, said stator element pole shoes (41-44) being shaped, in the direction of rotation of the rotor element, to define magnetically effective air gap dimensions which increase and decrease over the angular range of the pole shoes and further to provide, in the region of the pole gaps (44), compensation means to compensate for torque variations due to the presence of the pole gaps, the pulsed current flow through said winding means being controlled by said current flow control means (37) to energize a winding means when a rotor pole gap passes through a zone of magnetically effective decreasing air gap, while a pulse gap is controlled to occur when the rotor pole gap passes through a zone of magnetically effective increasing air gap;

wherein, as seen in the direction of rotation (26) of said rotor element (16), each stator element pole shoe (41-44) comprises a portion of strongly increasing magnetically effective air gap including the stator pole tips (61, 61A) adjacent to the respective stator pole gap (44, 44A, 44B) and a stator pole portion contiguous to said gap and extending to a position of maximum air gap (52) located approximately 10° to 20°-el away from the end (61A) of the adjacent pole tip (51A), and a portion of decreasing magnetically effective air gap comprising at least the majority of the remainder of the respective stator element pole shoe (41-44).

15. Motor according to claim 14, wherein the air gap (19) adjacent to the pole tip (61) pointing in the direction of rotation (26) has a portion (54) which, with respect to a cylindrical envelope (49) of said stator, in cross section has the approximate form of a biconvex lens and forms part of said portion of increasing magnetically 16. Motor according to claim 14, further including a portion of increasing magnetically effective air gap at a zone (54) adjacent the region of the pole at said minimum air gap (50), in which the effective air gap (53) has an intermediate value, said zone (54) extending over a range of from between 7° to 20°-el from the contiguous pole tip (61).

17. Motor according to claim 15, wherein said maximum air gap (52) has a width greater than the greatest value of the air gap at its portion (54) having the approximate form of a biconvex lens.

18. Motor according to claim 14, wherein the terminal ends (51, 51A) of the pole shoe tips are formed with extensions (61, 61A) projecting towards the rotor.

19. Motor according to claim 18, wherein said extensions are pointed projections.

20. Motor according to claim 14, wherein the pole gaps (17) of the rotor element are inclined or skewed with respect to the pole gaps (44) of the stator element.

21. Motor according to claim 20, wherein said angle of inclination or skew is in the order of between 20° to 45°.

22. Motor according to claim 14, wherein the terminal zones (51A, 52) of the pole tips immediately adjacent the pole gaps (44) comprise zones of increased iron volume magnetically effective to decrease the magnetic effect of said pole gaps;

said zones of increased iron volume being concentrated within an angular range of between about 5° to 10°-el from the limit of the stator pole gap.

23. Motor according to claim 14, wherein the width (N) of the stator pole gaps is more than 5% of one pole pitch (180°-el).

24. Motor according to claim 23, wherein said motor is an external rotor motor.

* * * * *